Figure 1:
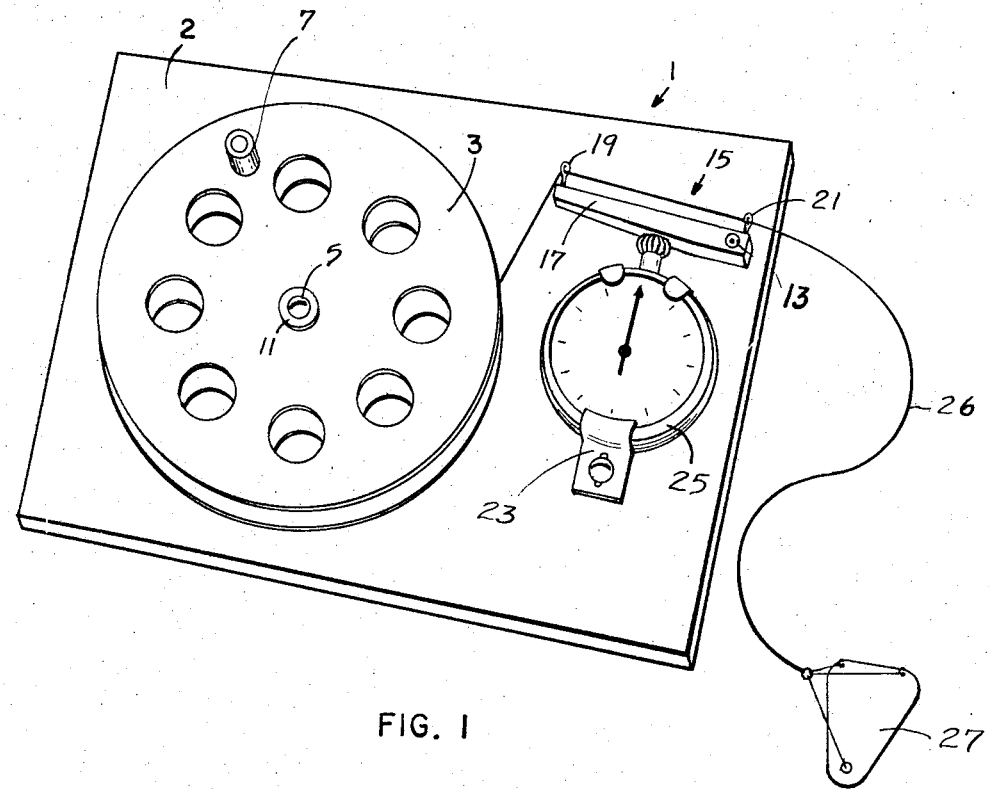

Oct. 31, 1967   B. C. KASPAR   3,349,616
SPEED MEASURING APPARATUS
Filed Oct. 21, 1965

BRYCE C. KASPAR
*INVENTOR.*

BY *William P. Heath, Jr*

United States Patent Office 3,349,616
Patented Oct. 31, 1967

3,349,616
SPEED MEASURING APPARATUS
Bryce C. Kaspar, 68 Huntley Circle,
Dover, Del. 19901
Filed Oct. 21, 1965, Ser. No. 499,657
7 Claims. (Cl. 73—184)

This invention is a device by which the speed of slowly moving vessels can be very accurately measure. The speed indicating device of my invention utilizes a line of a fixed or predetermined length mounted on and having one end attached to line storing apparatus, means attached to the other end of the line to pull the line from the line storing apparatus, and means for determining the time required for the predetermined length of line to be pulled from the line storing apparatus.

The device of my invention may be used with a slow moving vessel such as a sailing craft to very accurately determine the speed thereof as it moves over the surface of the water.

It has been customary in the past to use speed indicating devices utilizing drag or dynamic pressure to actuate the indicating mechanism. Such devices are subject to drawbacks which are substantially amplified when used on slowly moving sailing vessels. For example, these devices are inaccurate due to the lack of uniformity of the flow of water around the hull of the vessel as it moves through the water due to fact that water flows past different parts of the hull at different rates of flow. Well known prior art devices are further subject to be fouled by foreign matter floating at or near the surface of the water. In the case of a drag sensor, such as a whisker dragged through the water, marine growth will increase the drag factor, thereby causing the device to indicate erroneous speeds. Any floating matter such as weeds will adversely affect the speed indicator.

The speed indicator, which will be described in greater detail hereinafter, measures the average speed of the vessel in the following manner: A line storing and dispensing device is fixed to the vessel and a line of a known length is stored on the line storing device. One end of the line is attached to the line storing device. To the other or free end of the line is attached a sea anchor which can be collapsed on command. A timing device is mounted adjacent the line storing device and a double acting trigger mechanism is operatively associated with the line to actuate the timing device when the sea anchor is first placed in the water and to then stop the timing device when the line has been fully pulled from the line storing device. The timing device can be of the type which indicates only the time elapsed or it can be constructed to convert the time reading into speed units.

An object of my invention is to provide a device which will measure the average speed of a slowly moving vessel with very good accuracy and yet to produce a device which is relatively simple and is substantially immune to the generally recognized problems arising in the maintenance and operation of speed indications for water vessels. The above and other objects and the novel features of my invention will be apparent from the following description taken from the accompanying drawings.

Figure 2:
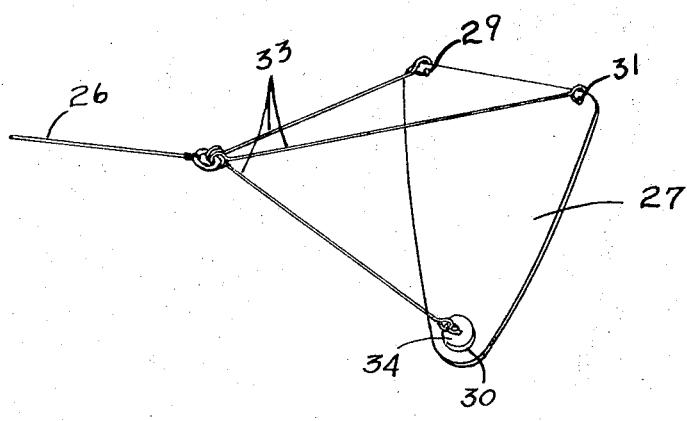

In the drawings:

FIGURE 1 is a perspective view of one embodiment of the speed measuring device of my invention; and FIGURE 2 is a perspective view of the anchoring device of my invention.

A preferred embodiment of the speed measuring apparatus 1 of my invention comprises a generally planar base member 2 having supporting means attached to the underside thereof. The supporting means may be small legs or a flat skid resistant sheet material attached to the underside. This, of course, is to permit the apparatus to be placed on the deck or any other convenient location of the vessel without marring the surface of same and at the same time to aid in frictionally holding the device at the exact location upon which it was placed.

A reel 3 is rotatably mounted on the base 2 by means of a shaft 5. The reel is made of a pair of platelike planar halves which are spaced apart by a plurality of cylindrical pins or dowels 7. Any one of said dowels may be extended through and above the surface of one of said planar members to serve as a crank handle 9 for rotating the reel about the shaft 5. The reel is affixed to the shaft 5 by means of a sintered bronze bearing 11.

Spaced away for a small distance from the shaft 5 is a second shaft 13 which extends from the face of said base in parallel relation to shaft 5. A double acting trigger mechanism 15 is mounted on said second shaft 13 for pivotal movement thereabout. The triggering mechanism comprises a generally rectangular bar member 17 having one end thereof pivotally attached to said second shaft 13. The free end of bar 17 is oriented so that it extends generally toward the reel 3. A line guide 19 is placed at the free end of the bar for receiving a line therethrough. At the pivoted end of the bar a second line guide 21 is provided.

Mounted immediately below the bar member is a spring clip arrangement 23 of any desired conventional manufacture which acts to retain a timing device 25, such as a stop watch in fixed relation to the planar base member. This clip arrangement is oriented so that the bar member 17 rests on the start-stop button or actuator of the time measuring device.

Attached to the reel is a line 26 of fixed or known length having low stretch characteristics. This line is normally stored on the reel when the speed indicating device is not in use. When the device is being used the line passes through the line guides on the trigger bar and over the stern of the vessel.

I further provide a chip 27 which preferably is generally planar and triangular in contour. At one point of the triangular chip I provide a magnetic weight 30 which is sufficient to render the buoyancy of the chip substantially neutral. At each of the two remaining points on the chip I provide means 29, 31 for attaching a harness 33 to the chip. The harness 33 may be made from three pieces of stainless wire-like material of substantially equal length attached together at one end thereof, the free ends being attached one to each point of the triangle. Normally I attach two of the harness members directly to two points of the chip and the third harness member is releasably attached to the magnetic weight 30. This attachment is preferably by means of magnetic attraction between the magnetic weight and a metal disc 34, attached to the third member of the harness.

When assembled and ready for use the known length of the low stretch line is wound on the reel and the free end of the line is attached to the harness on the chip. The line extends from the reel to and through the first and second line guides on the trigger bar respectively. The line, at the point which it changes direction when passing through the first line guide, changes about 90° with the trigger bar being included within the angle formed so that when a sharp jerk is applied to the line the trigger bar will be depressed and will in turn depress the start-stop button or actuator on the timing device.

In operaiton the device is placed on the deck of the vessel with a known length of line being wound on the reel and with a sufficient length extending from the device to allow the chip attached thereto to be dropped into the water.

When the chip is dropped into the water it will float at or just under the surface with its face being at a right angle to the surface of the water. This orientation gives maximum drag and resistance to movement of the chip through the water. The result is that the chip remains substantially stationary in the water as the moving vessel pulls the line and subsequently the chip. As the vessel and therefore the reel move away from the chip, the drag of the chip exerts a force on the line which is transmitted along the line to the reel.

This force is first recognized as a relatively sharp jerk which first causes the line to straighten at the 90° angle where it passes through line guide 19. This straightening action of the line depresses the trigger bar which in turn depresses the start-stop actuator on the timing device. This same force is simultaneously transmitted to the reel and results in starting the reel to turn and permit the stored line to be unwound therefrom. The turning of the reel relieves the constant pressure put on the line by the drag of the chip in the water a sufficient amount to release the start-stop actuator and to prevent the trigger bar from depressing a second time the start-stop actuator on the timing device. When the line has been completely stripped from the reel the drag of the chip again jerks the line and again depresses the start-stop actuator of the timing device and at the same time pulls the magnetic connector apart at the chip. The chip then planes to the surface of the water and skims along the surface of the water presenting little resistance and therefore can be easily reeled in and the line stored on the reel.

The time reading on the timing device is directly correlated to the distance traveled while the known length of line was being pulled out. These two known values are now to be used to compute the average speed of the vessel.

While I have disclosed a preferred embodiment of my invention, the following claims are intended to include those modifications and variations that are within the spirit and scope of my invention.

I claim:

1. A device for indicating the average speed of a moving body relative to the surface upon which said body is moving comprising, means for releasably storing a line, a line of predetermined length having one end fixed to said line storing means, anchoring means attached to the free end of said line, and time measuring means operatively associated with said line, said time measuring means being adapted to be started and stopped by actuating means responsive to forces transmitted by said line for measuring the time required for a known length of said line to be pulled from the line storing means after the line is initially achored as said moving body moves away from the anchored end thereof, whereby the average rate rate of speed of the moving body may be determined by comparing the distance traveled to time used.

2. Device of claim 1, in which said line storing means is a reel.

3. Device of claim 1, in which the line anchoring means comprises a chip, said chip having a harness attached thereto for maintaining it in generally perpendicular relation to the longitudinal axis of said line.

4. A device for indicating the average speed of a moving body relative to the surface upon which said body is moving comprising, means for releasably storing a line, a line of predetermined length having one end fixed to said line storing means, an anchoring chip attached to the free end of said line, said chip having a harness attached thereto for maintaining it in generally perpendicular relation to the longitudinal axis of said line, said harness having at least one point of attachment to said line releasable responsive to a predetermined drag value, and time measuring means operatively associated with said line for measuring the time required for a known length of said line to be pulled from the line storing means after the line is initially anchored as said moving body moves away from the anchored end thereof, whereby the average rate of speed of the moving body may be determined by comparing the distance traveled to time used.

5. Device of claim 4 in which said one point of attachment comprises a magnetic coupling.

6. Device of claim 1 in which a movable member is mounted adjacent said actuating means for selective contact therewith, said movable member being operatively associated with said line whereby it is sequentially moved responsive to variable forces applied by said line.

7. A device for indicating the average speed of a moving body relative to the surface upon which said body is moving comprising, a generally planar base, a reel mounted on said base for rotatable movement relative thereto, a trigger bar mounted on said base adjacent said reel, means for securing a timing device adjacent said trigger bar, a line of known length having one end thereof attached to said reel and being operatively connected to said trigger bar, said line being adapted to be wound on the reel, and an anchoring device attached to the free end of said line, whereby when the line is anchored by means of said anchoring device it by means of the trigger bar will start the timing device and after the line has been completely unwound from said reel it will stop the timing device thereby recording the time required for said known length of line to be unwound from said reel.

References Cited

UNITED STATES PATENTS

| 168,432 | 10/1875 | Trenchard | 73—184 |
| 219,460 | 9/1879 | Gordon | 73—184 |
| 919,707 | 4/1909 | Fahrney | 73—184 |
| 1,095,141 | 9/1914 | Cornelis | 73—184 |

FOREIGN PATENTS 1,993   10/1897   Great Britain.

LOUIS R. PRINCE, Primary Examiner.

NEIL B. SIEGEL, Assistant Examiner.